US011755360B2

(12) United States Patent
Inagaki et al.

(10) Patent No.: US 11,755,360 B2
(45) Date of Patent: Sep. 12, 2023

(54) DETECTING LAYERED BOTTLENECKS IN MICROSERVICES

(71) Applicant: INTERNATIONAL BUSINESS MACHINES CORPORATION, Armonk, NY (US)

(72) Inventors: Tatsushi Inagaki, Yokohama (JP); Yohei Ueda, Shinagawa (JP); Tatsuhiro Chiba, Bunkyo-ku (JP); Marcelo Carneiro Do Amaral, Tokyo (JP); Sunyanan Choochotkaew, Koto (JP); Qi Zhang, West Harrison, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 295 days.

(21) Appl. No.: 17/375,185

(22) Filed: Jul. 14, 2021

(65) Prior Publication Data
US 2023/0019920 A1    Jan. 19, 2023

(51) Int. Cl.
*G06F 9/46*     (2006.01)
(52) U.S. Cl.
CPC ..................... *G06F 9/46* (2013.01)
(58) Field of Classification Search
CPC ....................................................... G06F 9/46
See application file for complete search history.

(56) References Cited

U.S. PATENT DOCUMENTS

| 2013/0042246 A1* | 2/2013 | Berry | G06F 1/3209 |
| | | | 718/102 |
| 2016/0080233 A1* | 3/2016 | Reynolds | H04L 43/0876 |
| | | | 709/224 |
| 2020/0364035 A1 | 11/2020 | White | |

OTHER PUBLICATIONS

Sriraman, Akshitha, and Thomas F. Wenisch. "μtune: Auto-tuned threading for{OLDI} microservices." 13th {USENIX} Symposium on Operating Systems Design and Implementation ({OSDI} 18). 2018. (Year: 2018).*
Inagaki et al., "Profile-based Detection of Layered Bottlenecks ", InProceedings of the 2019 ACM/SPEC International Conference on Performance Engineering Apr. 4, 2019 (pp. 197-208).

(Continued)

*Primary Examiner* — Charlie Sun
(74) *Attorney, Agent, or Firm* — Tutunjian & Bitetto, P.C.; Randy Emilio Tejeda

(57) ABSTRACT

A computer-implemented method for detecting bottlenecks in microservice cloud systems is provided including identifying a plurality of nodes within one or more clusters associated with a plurality of containers, collecting thread profiles and network connectivity data by periodically dumping stacks of threads and identifying network connectivity status of one or more containers of the plurality of containers, classifying the stacks of threads based on a plurality of thread states, constructing a microservice dependency graph from the network connectivity data, aligning the plurality of nodes to bar graphs to depict an average number of working threads in a corresponding microservice, and generating, on a display, an illustration outlining the plurality of thread states, each of the plurality of thread states having a different representation.

20 Claims, 10 Drawing Sheets

(56) References Cited

OTHER PUBLICATIONS

Zhou et al., "wPerf: generic Off-CPU analysis to identify bottleneck waiting events", In13th {USENIX} Symposium on Dperating Systems Design and Implementation ({OSDI} 18) Oct. 2018 (pp. 527-543).

Brondolin et al., "A Black-box Monitoring Approach to Measure Microservices Runtime Performance.", ACM Transactions on Architecture and Code Optimization (TACO). Nov. 10, 2020 (pp. 1-26.).

Watson et al., "A microscope on microservices.", The Netflix Tech Blog, http://techblog. netflix. com/2015/02/a-microscope-on-microservies. html. Feb. 18, 2015.

Solé et al., "Graph-based root cause analysis for service-oriented and microservice architectures." Journal of Systems and Software. Jan. 1, 2020 (pp. 1-28).

Wavefront by VMWare, "Guide to Finding and Resolving Microservices Bottlenecks with Modern Observability, How to Quickly Troubleshoot and Optimize Modern Applications with Metrics, Histograms, and Traces", https://advance.biz-tech-insights.com/whitepaper/eBook_Observability.pdf, 2019 (pp. 1-31).

Michael Gerstenhaber, "Introducing the Service Map in Datadog", https://www.datadoghq.com/blog/service-map/, Aug. 16, 2018 (pp. 1-10).

Wu et al., "Performance Diagnosis in Cloud Microservices using Deep Learning", AIOPS 2020—International Workshop on Artificial, Intelligence for IT Operations, Dec. 2020, Dubai, United Arab Emirates (pp. 1-13).

\* cited by examiner ized subject-matters. In
DETECTING LAYERED BOTTLENECKS IN MICROSERVICES

BACKGROUND

The present invention relates generally to microservices (μservice), and more specifically, to detecting layered bottlenecks in μservice applications.

Employing micro-services allows breaking down complex applications into relatively simple independent processes, thus producing highly decoupled systems. Each system may include multiple applications that are hosted on a provider's infrastructure. Each process associated with the services is focused on doing a relatively simple task to support the applications for each individual customer.

SUMMARY

In accordance with an embodiment, a computer-implemented method for detecting layered bottlenecks in μservice applications is provided. The computer-implemented method includes identifying a plurality of nodes within one or more clusters associated with a plurality of containers, collecting thread profiles and network connectivity data by periodically dumping stacks of threads and identifying network connectivity status of one or more containers of the plurality of containers, classifying the stacks of threads based on a plurality of thread states, constructing a microservice dependency graph from the network connectivity data, aligning the plurality of nodes to bar graphs to depict an average number of working threads in a corresponding microservice, and generating, on a display, an illustration outlining the plurality of thread states, each of the plurality of thread states having a different representation.

In accordance with another embodiment, a computer program product for detecting layered bottlenecks in μservice applications is provided. The computer program product includes a computer readable storage medium having program instructions embodied therewith, the program instructions executable by a computer to cause the computer to identify a plurality of nodes within one or more clusters associated with a plurality of containers, collect thread profiles and network connectivity data by periodically dumping stacks of threads and identify network connectivity status of one or more containers of the plurality of containers, classify the stacks of threads based on a plurality of thread states, constructing a microservice dependency graph from the network connectivity data, align the plurality of nodes to bar graphs to depict an average number of working threads in a corresponding microservice, and generate, on a display, an illustration outlining the plurality of thread states, each of the plurality of thread states having a different representation.

In accordance with yet another embodiment, a system for detecting layered bottlenecks in μservice applications is provided. The system includes a memory and one or more processors in communication with the memory configured to identify a plurality of nodes within one or more clusters associated with a plurality of containers, collect thread profiles and network connectivity data by periodically dumping stacks of threads and identify network connectivity status of one or more containers of the plurality of containers, classify the stacks of threads based on a plurality of thread states, constructing a microservice dependency graph from the network connectivity data, align the plurality of nodes to bar graphs to depict an average number of working threads in a corresponding microservice, and generate, on a display, an illustration outlining the plurality of thread states, each of the plurality of thread states having a different representation.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
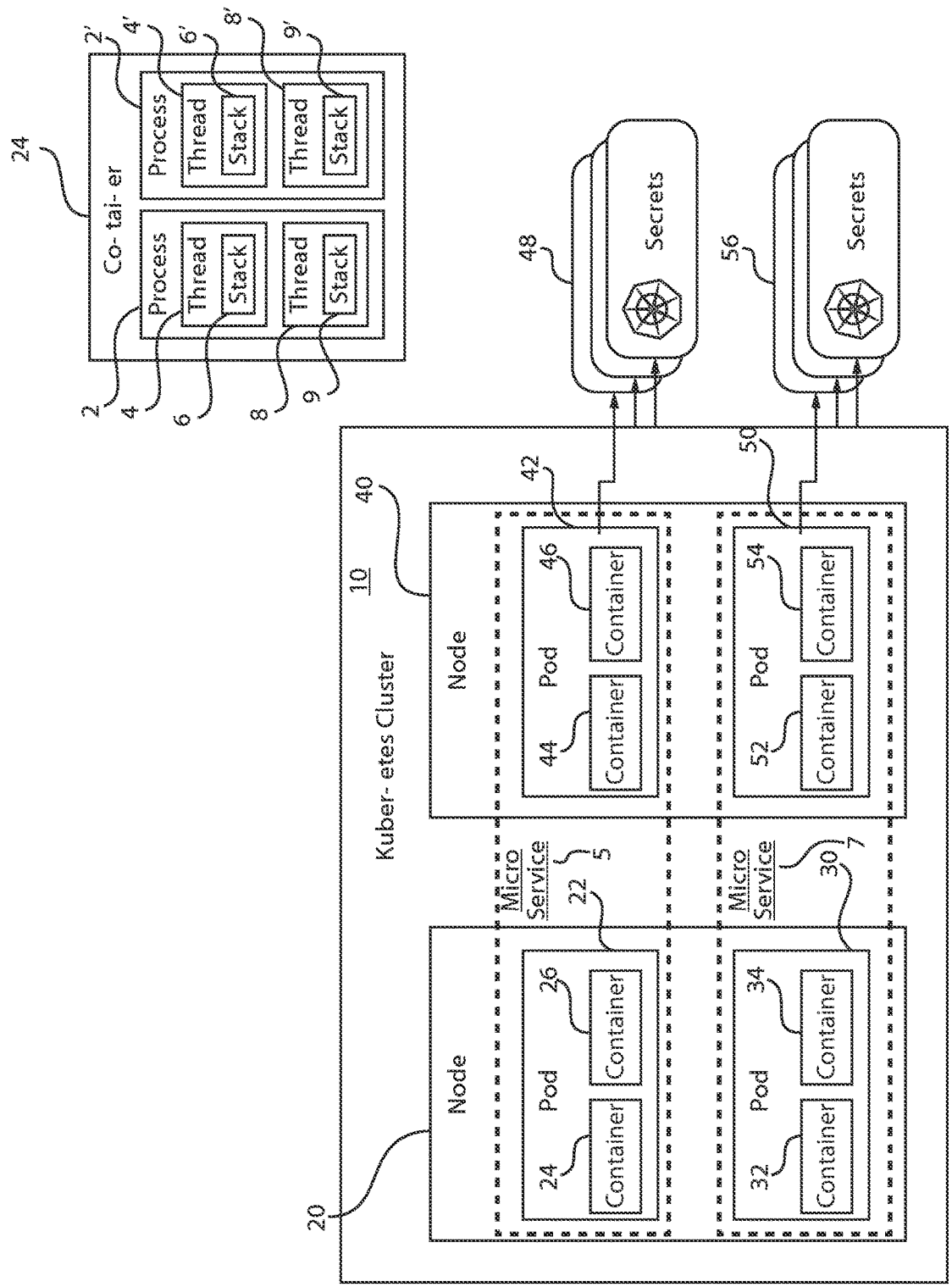
FIG. 1 shows an exemplary microservice cluster, in accordance with an embodiment of the present invention.

Embodiments in accordance with the present invention provide methods and devices for detecting software and hardware bottlenecks in microservice (or μService) cloud computing systems. The exemplary embodiments disclose methods and systems to identify performance bottlenecks.

Stated differently, the exemplary embodiments identify global bottlenecks in the entire microservices.

Microservices or µServices, also known as microservice architectures, are architectural styles that structure an application as a collection of services that are highly maintainable and testable, loosely coupled, independently deployable, organized around business capabilities, and owned by a small team. Microservice architectures enable the rapid, frequent and reliable delivery of large, complex applications.

Many types of public and private Cloud systems require their users to declare how many instances their workload will need during execution, and the resources needed. In public Cloud platforms, users need to choose the type and the number of virtual machines (VMs) they will rent, whereas in a cluster, users set the number of Pod replicas and resource limits for individual Pods. In Google, users are asked to specify the number of containers they need and the resource limits for each. Such limits make cloud computing possible, by enabling the Cloud infrastructure to provide adequate performance isolation. However, despite declaring how many instances are needed for a workload, bottlenecks can still be present in microservice applications.

A resource bottleneck is anything inherent about the way the microservice utilizes its resources that limits the scalability of the application. This could be an infrastructure bottleneck or something within the architecture of the service that prevents it from being scalable. A bottleneck is the point in a system where contention occurs. In any system, these points usually surface during periods of high usage or load. Once identified, the bottleneck may be remedied bringing performance levels into an acceptable range. Utilizing synthetic load testing enables testing specific scenarios and identifying potential bottlenecks, although this only covers contrived situations.

Key performance indicators from the application include request/sec, latency, and request duration. Indicators from the runtime or infrastructure also include CPU time, memory usage, heap usage, garbage collection, etc. However, this list isn't inclusive, as there may be business metrics or other external metrics which may factor into the optimizations as well.

Remedies for preventing bottlenecks may include any number of optimizations but usually result in refactoring, caching and data optimization, threading and/or workload distribution.

The exemplary embodiments of the present invention address such bottleneck issues in microservice applications by collecting thread profiles and network connectivity by timer-based sampling, whose runtime overhead can be minimized. A microservice dependency graph is then constructed from the network connectivity and the nodes are aligned to bar graphs to show an average number of working threads in the corresponding microservice, which can be drilled down in a flame graph of the corresponding threads.

The exemplary embodiments of the present invention further generate a weighted microservice dependency graph by being provided with pairs of microservices whose source connects to target, by using the partial order of the connectivity, topologically sorting the microservices, adding a dummy total order among the microservices based on the sorted order of the microservices, drawing or generating the dependency graph of the microservices, and aligning a bar graph of the average number of threads adjacent to the dependency graph.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

FIG. 1 shows an exemplary microservice cluster, in accordance with an embodiment of the present invention.

Microservices or µServices are independent components of a software or computer system application that runs on a computer system or environment, e.g., on a computing device, a server, or other similar computing systems. Each microservice may be independently deployed, scaled, and maintained. Because each microservice may be independently deployed, the development of each microservice may be parallelized across multiple teams. Microservices are often used as plug and play components to provide new services in a cloud based environment. As demand for each microservice increases or decreases, the resources, e.g., processors, memory, bandwidth, etc., assigned to that microservice may also be increased or decreased as needed to meet the demand. This increase or decrease, sometimes referred to as auto scaling, is often performed automatically in response to the increase or decrease in demand so that only the required amount of computer resource capacity, e.g., processors, memory, bandwidth, etc., is allocated to the microservice.

Therefore, µServices are application designs with multiple loosely-coupling services communicating to each other via message passing protocols to serve a common goal to clients and scaling is a mechanism to increase or decrease resources for services that can be performed in two dimensions that are duplication/replicas (horizontal) and CPU/memory provisions (vertical) provided by, e.g., a cloud orchestrator. Further, traffic routing is the ability to control the load traffic to each replicated container depending on specified rules performed by service-mesh operator (e.g., Istio).

Referring back to FIG. 1, a cluster 10 includes one or more nodes. In one example, the cluster 10 can be a Kubernetes cluster. The cluster 10 can be handled by one or more users 1. A container (e.g., 24) has one or more processes 2, 2'. Each process 2, 2' has one or more threads 4, 4', 8, 8'. Each thread 4, 4', 8, 8' has its dedicated execution stack 6, 6', 9, 9' and state, which is running, blocked, waiting, and so on.

In FIG. 1 cluster 10 includes a first node 20 and a second node 40. The nodes 20, 40 are machines (e.g., virtual machines (VMs), physical servers, etc.) that run the applications. Each node 20, 40 includes a plurality of Pods. The first node 20 can include a first Pod 22 and a second Pod 30. The second node 40 can include a first Pod 42 and a second Pod 50. A Pod is the smallest object that contains one or more containers, storage resources, network IP and other configurations. First Pod 22 of first node 20 can include containers 24, 26 and second Pod 30 of first node 20 can include containers 32, 34. Similarly, first Pod 42 of second node 40 can include containers 44, 46 and second Pod 50 of second node 40 can include containers 52, 54. A Service defines a set of Pods and how they are accessed. A first microservice 5 defines how Pods 22, 42 are accessed, whereas second microservice 7 defines how Pods 30, 50 are accessed. A Volume is a shared storage for containers, and many different types are supported.

Each of the Pods can include secret tokens. For example, Pod 42 includes secret tokens 48 and Pod 50 includes secret tokens 56. In one example, these secret tokens can be Kubernetes Secrets, which allows a user to store and manage sensitive information, such as passwords, OAuth tokens, and secure shell (SSH) keys. OAuth is an authentication protocol that allows a user to approve one application interacting with another on the user's behalf without giving away the user password. A Secret is an object that includes a small amount of sensitive data such as a password, a token, or a key. Such information might otherwise be put in a Pod specification or in an image. Storing confidential information in a Secret is safer and more flexible than putting it verbatim in a Pod definition or in a container image.

Containers are an alternative to virtual machines for helping developers to build, ship, deploy, and instantiate applications. A container is a set of processes that are isolated from the rest of the machine encapsulating its dependencies. Containers run in isolation, sharing an operating system (OS) instance. Containers do not need an entire guest operating system, making containers lighter by an order of magnitude compared to virtual machines. As containers can start in a matter of seconds, more quickly than virtual machines, containers are made to take a limited amount of resources (e.g., less than 2 GB of RAM) and scale to satisfy the demand. Containers are often used in microservices architectures where each container represents a service, connected to the other services through the network. This microservice architecture allows each component to be deployed and scaled independently of the others.

A deployment provides declarative updates for Pods and ReplicaSets. A deployment's primary purpose is to declare how many replicas of a Pod should be running at a time. When a deployment is added to the cluster, it will automatically spin up the requested number of Pods, and then monitor them. If a Pod dies, the deployment will automatically re-create it. Pods are the smallest deployable units of computing that can be created and managed in the cluster.

A Pod is a group of one or more containers, with shared storage and network resources, and a specification for how to run the containers. A Pod's contents are always co-located and co-scheduled, and run in a shared context. A Pod models an application-specific "logical host," that is, it includes one or more application containers which are relatively tightly coupled. A workload is an application running on the cluster. Whether the workload is a single component or several that work together, workloads run inside a set of Pods.

A node may be a virtual or physical machine, depending on the cluster. Each node is managed by the control plane and includes the services necessary to run Pods.

A deployment can be defined to create a ReplicaSet or to remove deployments and adopt all their resources with new deployments. When a deployment is revised, a ReplicaSet is created that describes the state that desired. During a rollout, the deployment controller changes the actual state to the state desired at a controlled rate. Each deployment revision can also be rolled back. Deployments can also be scaled. A ReplicaSet is a set of Pod templates that describes a set of Pod replicas. ReplicaSet uses a template that describes what each Pod must include. The ReplicaSet ensures that a specified number of Pod replicas are running at any time.

A thread is the basic unit to which the operating system allocates processor time. A thread can execute any part of the process code, including parts currently being executed by another thread. Threads allows a program to operate more efficiently by doing multiple things at the same time. Threads can be used to perform complicated tasks in the background without interrupting the main program.

Figure 2:
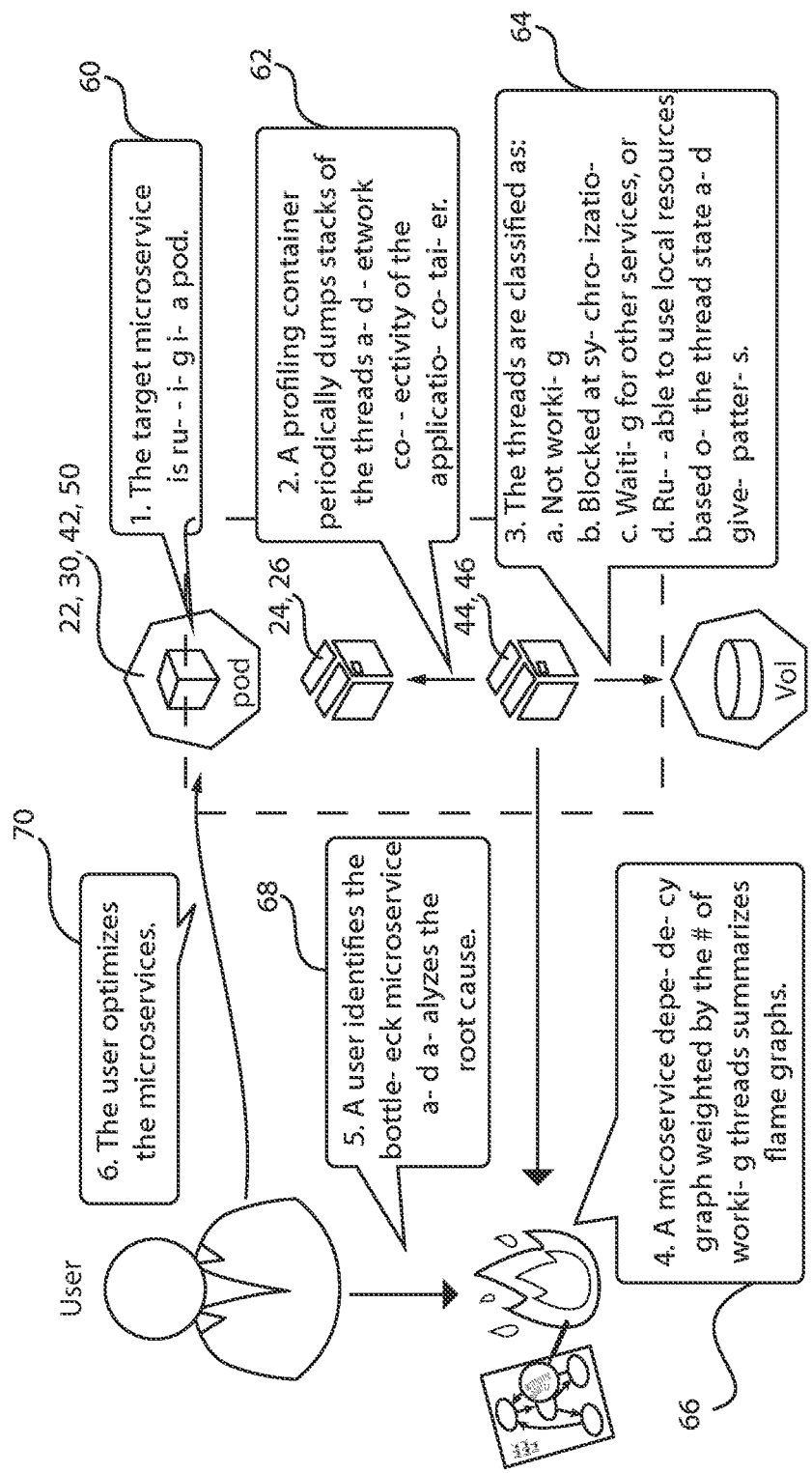
FIG. 2 is a block/flow diagram of an exemplary method for visualizing bottlenecks, in accordance with an embodiment of the present invention.

FIG. 2 is a block/flow diagram of an exemplary method for visualizing bottlenecks, in accordance with an embodiment of the present invention.

At block 60, the target microservice is running on a pod 22, 30, 42, 50 (FIG. 1).

At block 62, a profiling container 24, 26 (FIG. 1) periodically dumps stacks of the threads and network connectivity data of the application container.

At block 64, the threads are classified as follows: "not working" state, "blocked at synchronization" state, "waiting for other services" state or "runnable to use local resources" state. The threads are classified based on the thread state and the given patterns.

At block 66, a microservice dependency graph is generated and weighted by the number of working threads. A bar graph can be generated directly adjacent the microservice dependency graph. The bar graph displays the average number of working threads.

At block 68, a user identifies the bottleneck microservice and analyzes the root cause.

At block 70, the user optimizes the microservices.

There are several debugging tools to profile threads and to detect network connectivity. For network connectivity, tools can include lsof and netstat. For threads, tools can include j stack (Java—OpenJDK), java dump (Java—OpenJ9), gdb (GNU C/C++), Goroutine profile (Go), faulthandler (Python), and wtfnode (Node.js). One skilled in the art can contemplate employing any other tools.

Figure 3:
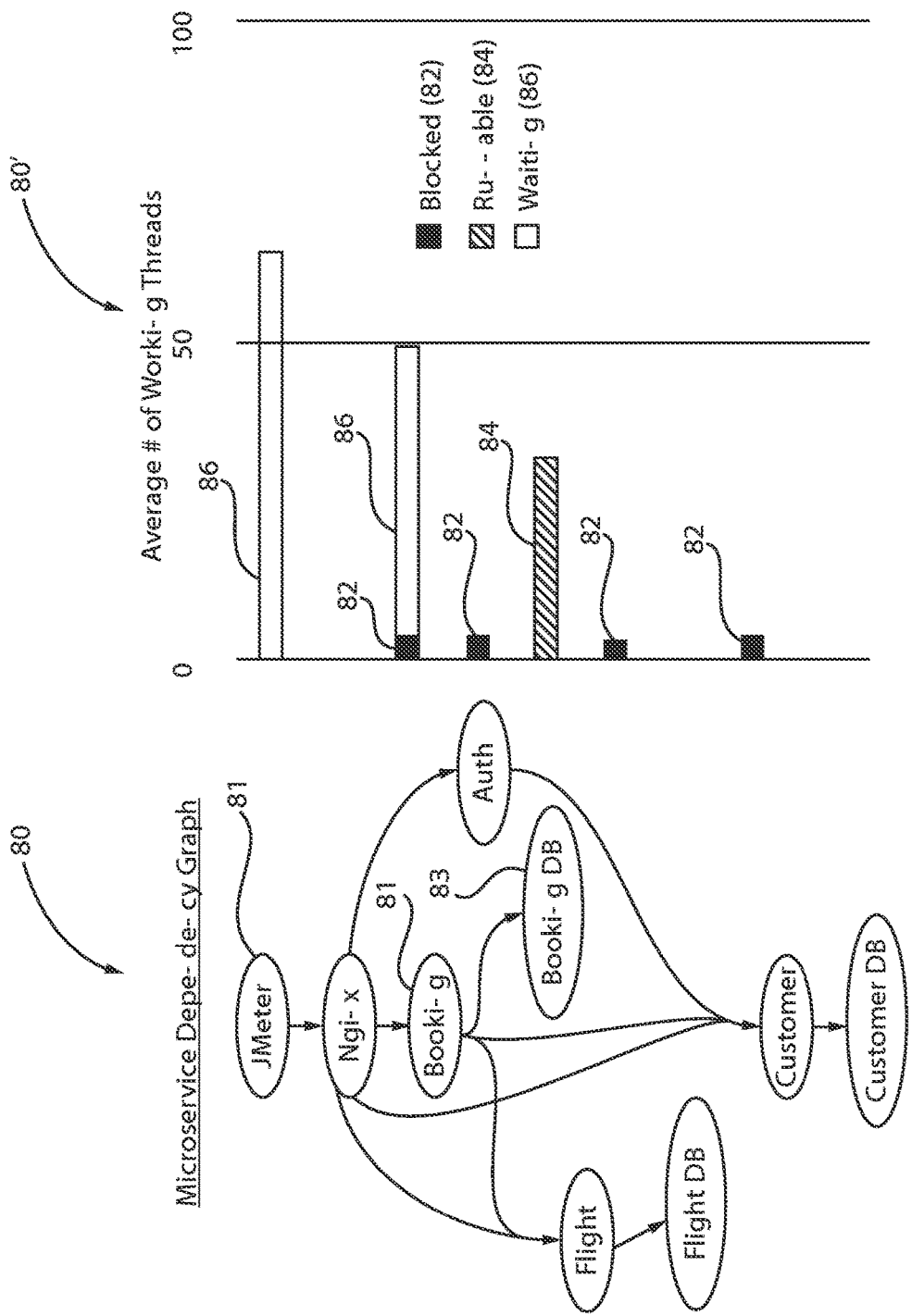
FIG. 3 is a block/flow diagram of an exemplary microservices dependency graph, in accordance with an embodiment of the present invention.

FIG. 3 is a block/flow diagram of an exemplary microservices dependency graph, in accordance with an embodiment of the present invention.

The microservice dependency graph 80 is illustrated, where the bar graph 80' is generated directly adjacent the microservice dependency graph 80. The microservice dependency graph 80 illustrates dependencies of various variables or parameters or functions or nodes. For example, the waiting status 86 is assigned to nodes 81 (JMeter and Booking), whereas the runnable status 84 is assigned to node 83 (Booking DB).

The bar graph 80' includes bars 82 representing blocked thread status, bars 84 representing runnable thread status, and bars 86 representing waiting status.

Thus, nodes "JMeter" and "Booking" are in waiting status 86, whereas the "Booking DB" node is in runnable status 84. The bar graph 80' displays the average number of working threads.

Figure 4:
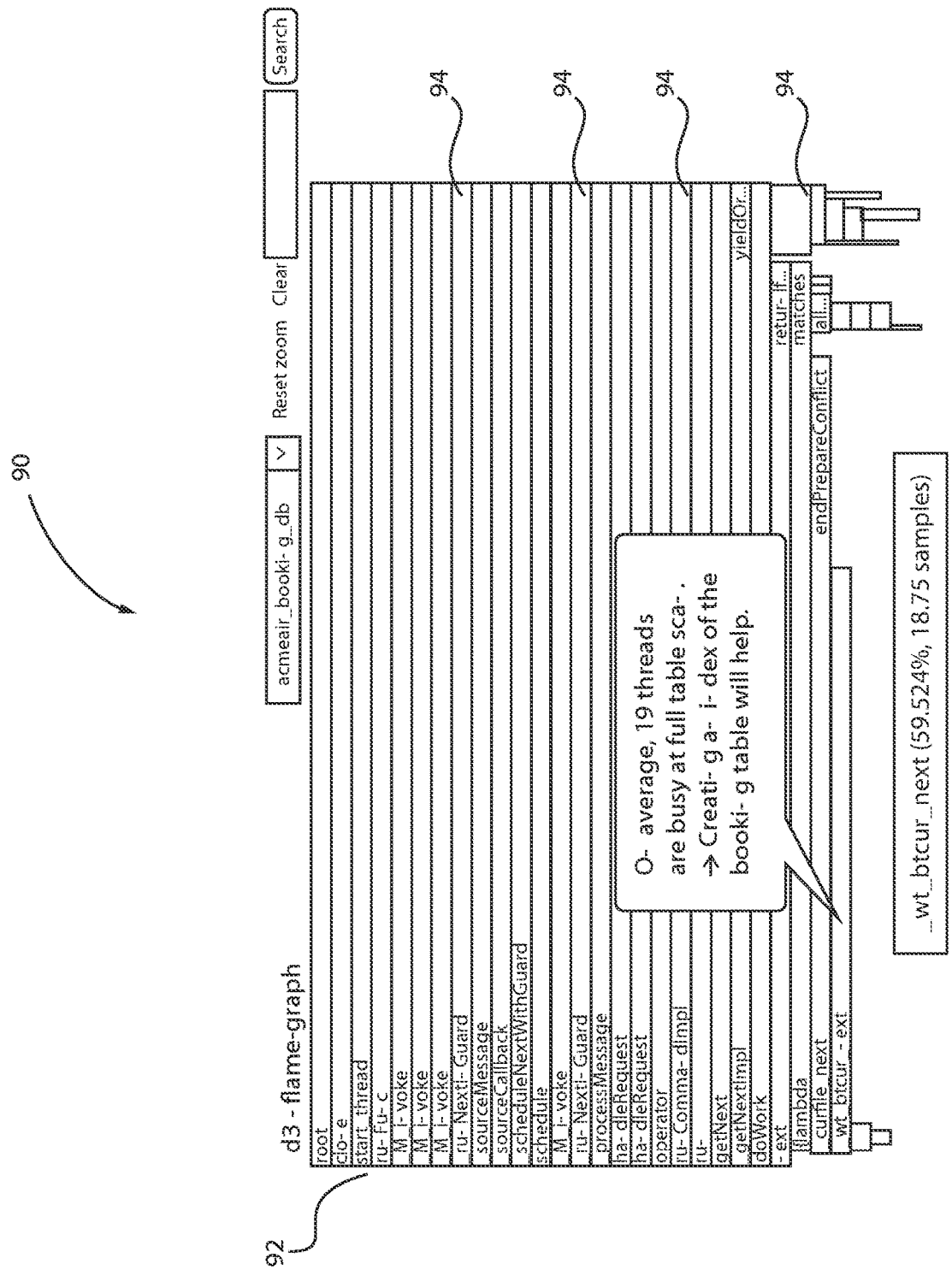
FIG. 4 is a block/flow diagram of an exemplary flame graph, in accordance with an embodiment of the present invention.

FIG. 4 is a block/flow diagram of an exemplary flame graph, in accordance with an embodiment of the present invention.

The flame graph 90 includes a list of threads 92, as well as different color schemes 94 that can be used for the threads 92. The flame graph 90 can be an icicle chart as the flame graph is upside down or inverted.

It is noted that flame graphs are a visualization of profiled software, allowing the most frequent code-paths to be identified quickly and accurately.

Figure 5:
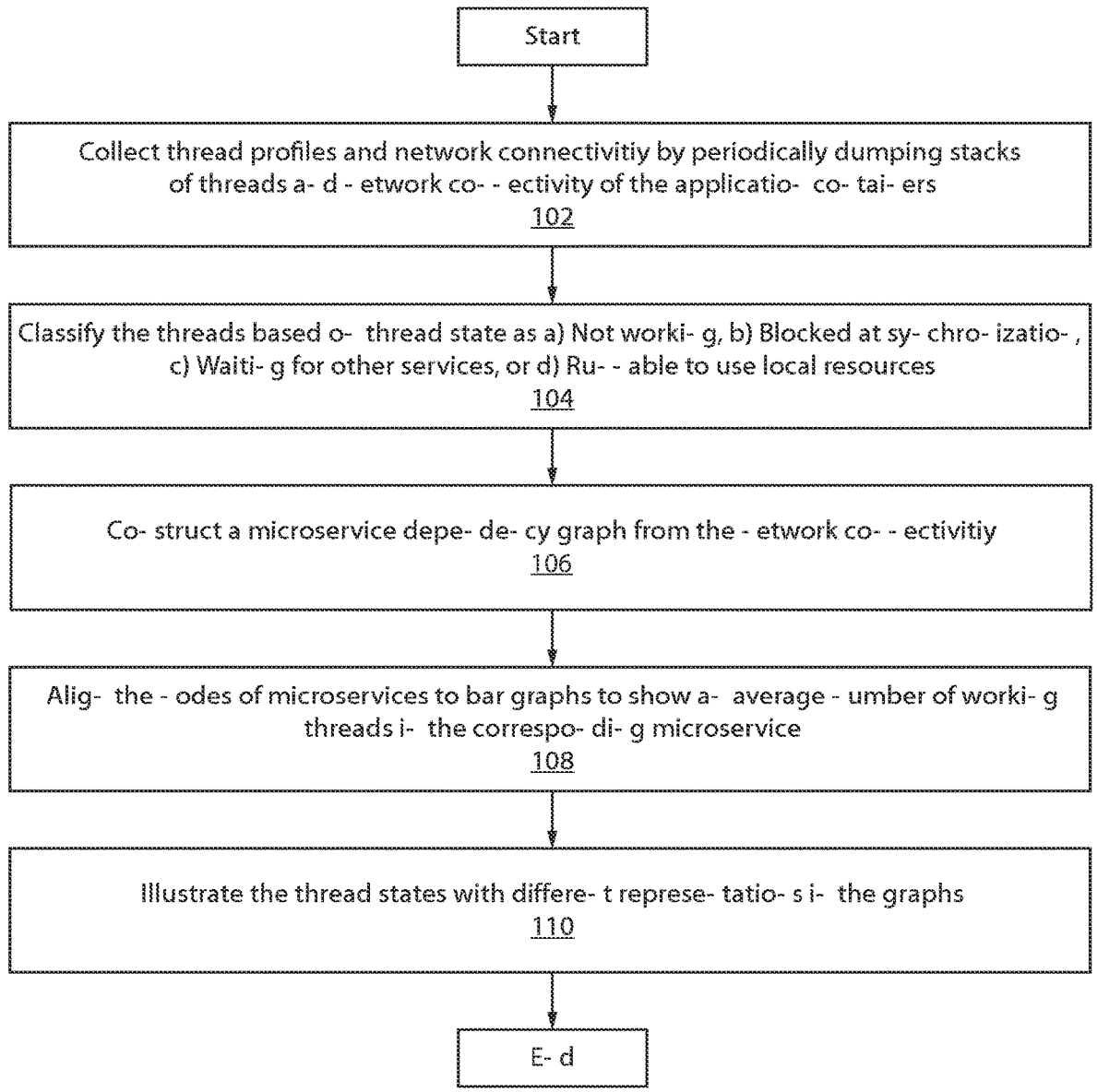
FIG. 5 is a block/flow diagram of an exemplary method for detecting software and hardware bottlenecks in microservice cloud systems, in accordance with an embodiment of the present invention.

FIG. 5 is a block/flow diagram of an exemplary method for detecting software and hardware bottlenecks in microservice cloud systems, in accordance with an embodiment of the present invention.

At block 102, collect thread profiles and network connectivity by periodically dumping stacks of threads and network connectivity of the application containers.

At block 104, classify the threads based on thread state as: not working, blocked at synchronization, waiting for other services, or runnable to use local resources.

At block 106, construct a microservice dependency graph from the network connectivity.

At block 108, align the nodes of microservices to bar graphs to show an average number of working threads in the corresponding microservice.

At block 110, illustrate the thread states with different representations in the graphs.

Figure 6:
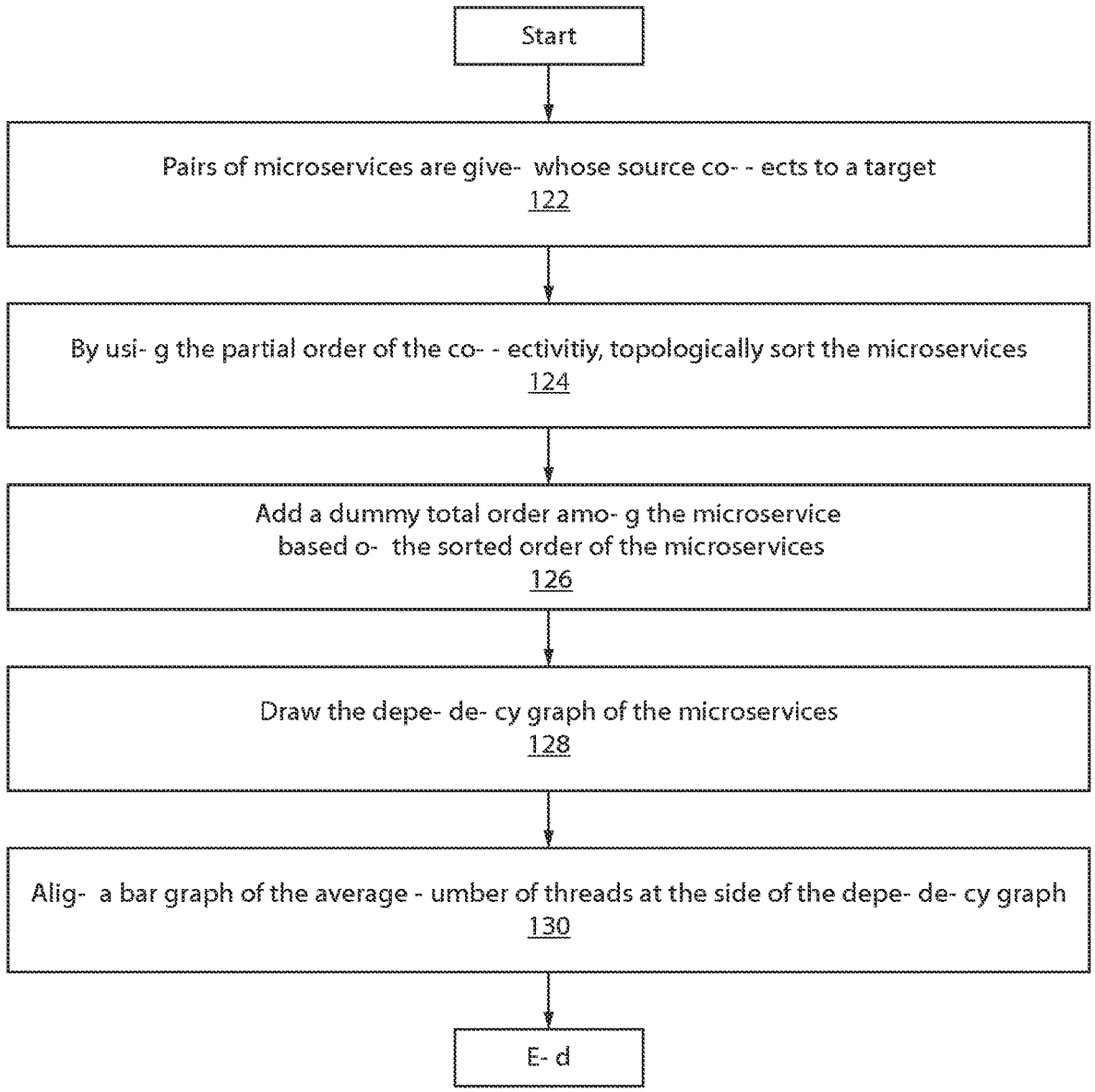
FIG. 6 is a block/flow diagram of an exemplary method for generating a weighted microservice dependency graph, in accordance with an embodiment of the present invention.

FIG. 6 is a block/flow diagram of an exemplary method for generating a weighted microservice dependency graph, in accordance with an embodiment of the present invention.

At block 122, pairs of microservices are given whose source connects to a target.

At block 124, by using the partial order of the connectivity, topologically sort the microservices.

At block 126, add a dummy total order among the microservice based on the sorted order of the microservices.

At block 128, draw the dependency graph of the microservices.

At block 130, align a bar graph of the average number of threads at the side of the dependency graph.

Figure 7:
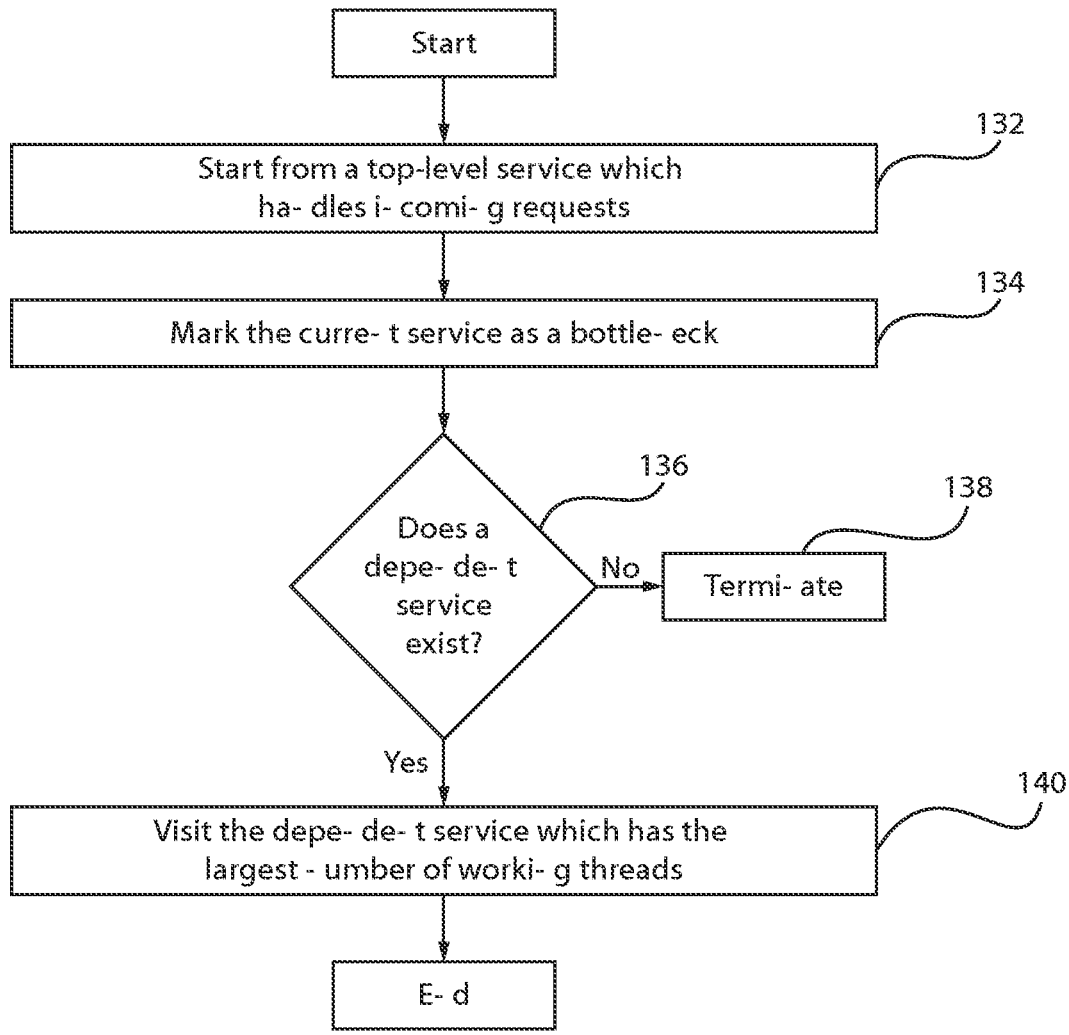
FIG. 7 is a block/flow diagram of an exemplary method for identifying bottleneck services, in accordance with an embodiment of the present invention.

FIG. 7 is a block/flow diagram of an exemplary method for identifying bottleneck services, in accordance with an embodiment of the present invention.

At block 132, start from a top-level service which handles incoming requests.

At block 134, mark the current service as a bottleneck.

At block 136, determine whether a dependent service exists. If NO, proceed to block 138 to terminate the operation. If YES, proceed to block 140.

At block 140, visit the dependent service which has the largest number of working threads.

Therefore, the present invention provides methods and systems to address bottleneck issues in microservice applications by collecting thread profiles and network connectivity by timer-based sampling, whose runtime overhead can be minimized. A microservice dependency graph is then constructed from the network connectivity and the nodes are aligned to bar graphs to show the average number of working threads in the corresponding micro service, which can be drilled down in a flame graph of the corresponding threads. The exemplary embodiments of the present invention further generate a weighted microservice dependency graph by being provided with pairs of microservices whose source connects to target, by using the partial order of the connectivity, topologically sorting the microservices, adding a dummy total order among the microservices based on the sorted order of the microservices, drawing or generating the dependency graph of the microservices, and aligning a bar graph of the average number of threads adjacent to the dependency graph. Thus, the exemplary embodiments identify layered bottlenecks in microservices or model microservices as layered bottlenecks.

The exemplary embodiments further disclose a method for building a weighted microservice dependency graph whose node represents a given microservice and link represents dependency between microservices, whose dependency is collected by sampling network connectivity at each microservice, whose node has a weight which is the average number of working threads, which is sampled by using standard debugging tools of each microservice, whose threads are classified into the following categories by detecting a corresponding function in the stack frames of a thread: not working and waiting for an incoming request, runnable to use a processor or disk, blocked at synchronization, or waiting for another microservice or an outer service over network, and whose nodes are aligned with stacked bar graphs showing the weights of the categories.

Figure 8:
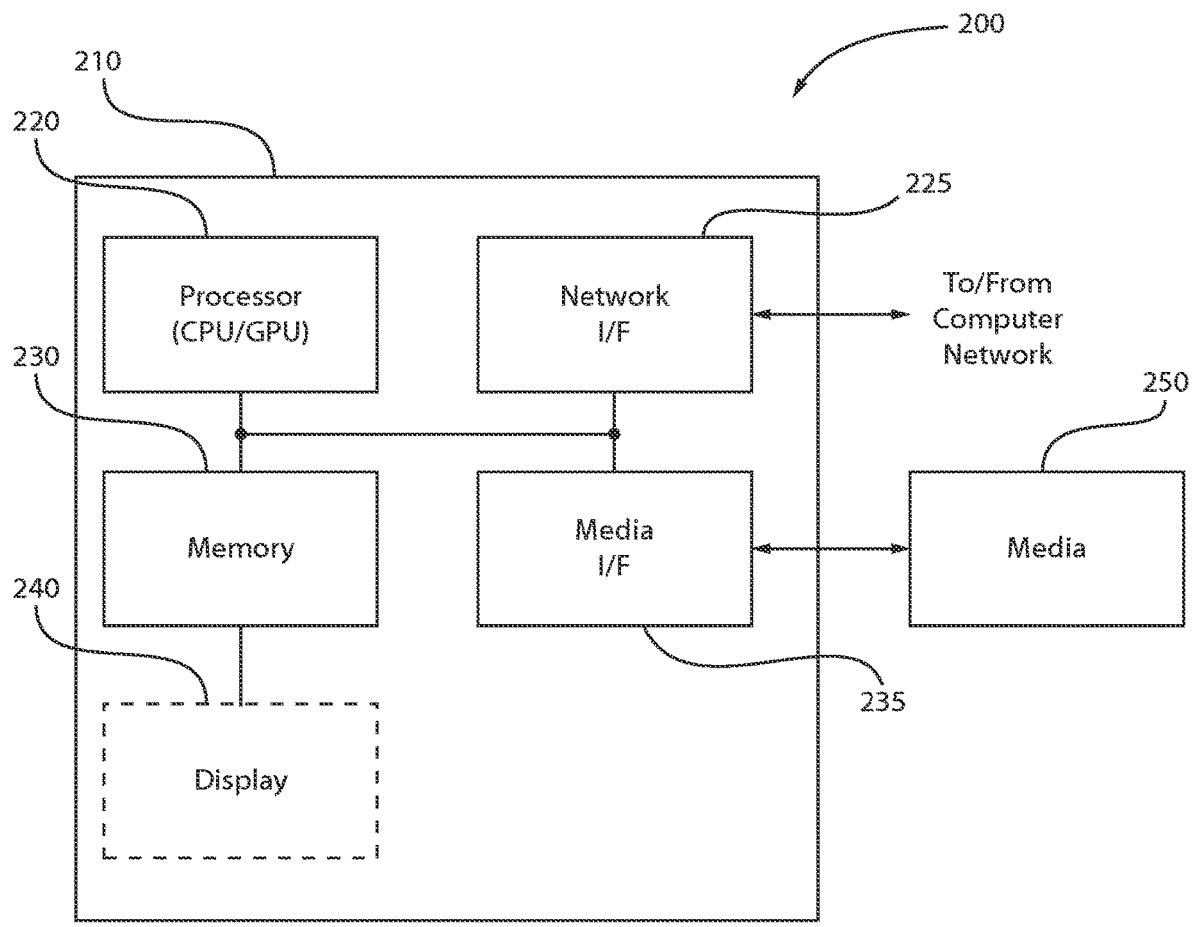
FIG. 8 is a block/flow diagram of an exemplary processing system for detecting software and hardware bottlenecks in microservice cloud systems, in accordance with an embodiment of the present invention.

FIG. 8 is a block/flow diagram of an exemplary processing system for detecting software and hardware bottlenecks in microservice cloud systems, in accordance with an embodiment of the present invention.

A block diagram is shown of an apparatus 200 for implementing one or more of the methodologies presented herein.

Apparatus 200 includes a computer system 210 and removable media 250. Computer system 210 includes a CPU device and a GPU device collectively referred to as 220, a network interface 225, a memory 230, a media interface 235 and an optional display 240. Network interface 225 allows computer system 210 to connect to a network, while media interface 235 allows computer system 210 to interact with media, such as a hard drive or removable media 250.

CPU/GPU 220 can be configured to implement the methods, steps, and functions disclosed herein. The memory 230 could be distributed or local and the processor CPU/GPU 220 could be distributed or singular. The memory 230 could be implemented as an electrical, magnetic or optical memory, or any combination of these or other types of storage devices. Moreover, the term "memory" should be construed broadly enough to encompass any information able to be read from, or written to, an address in the addressable space accessed by CPU/GPU 220. With this definition, information on a network, accessible through network interface 225, is still within memory 230 because the processor device 220 can retrieve the information from the network. It should be noted that each distributed processor that makes up CPU/GPU 220 generally includes its own addressable memory space. It should also be noted that some or all of computer system 210 can be incorporated into an application-specific or general-use integrated circuit.

Optional display 240 is any type of display suitable for interacting with a human user of apparatus 200. Generally, display 240 is a computer monitor or other similar display.

Figure 9:
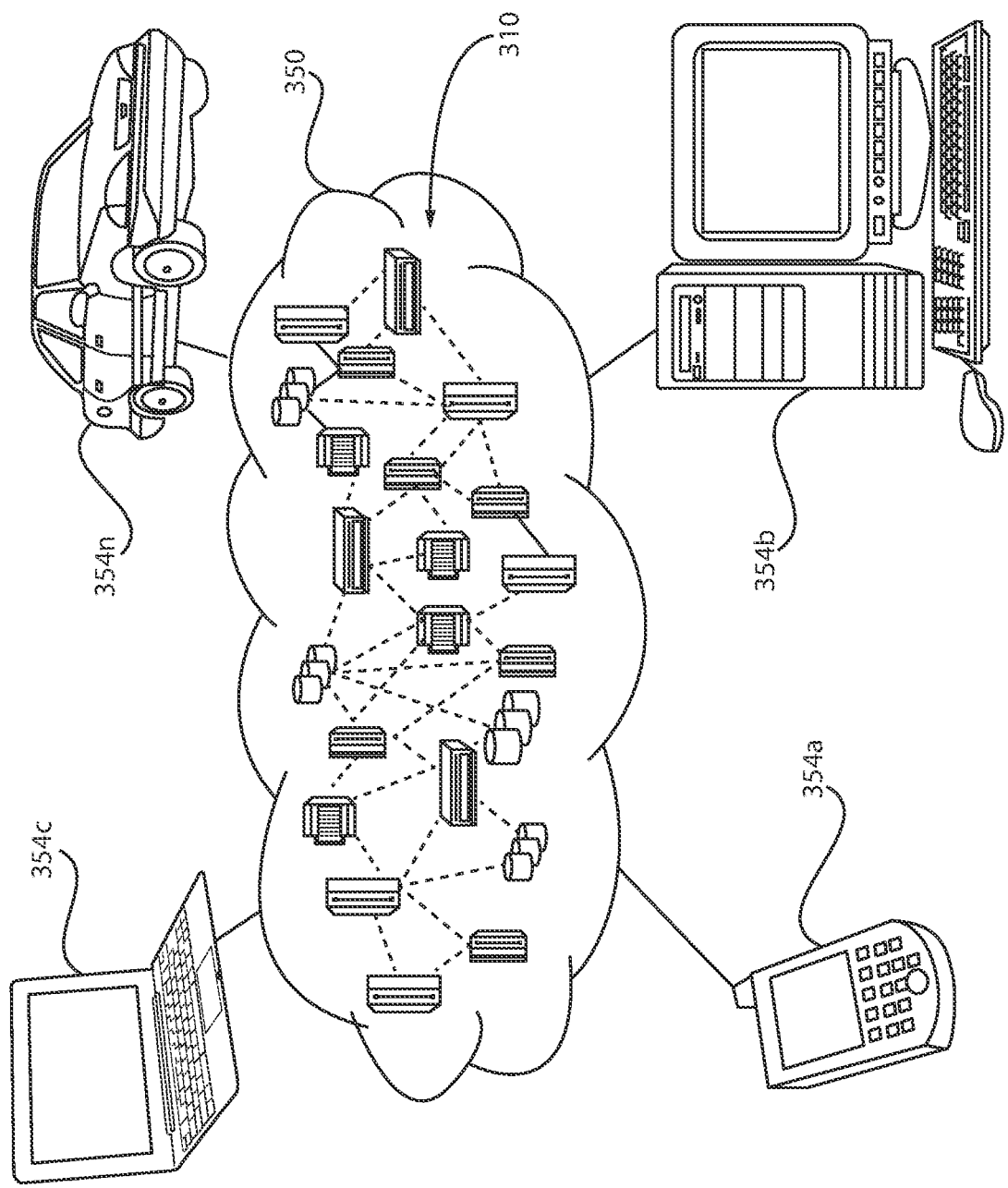
FIG. 9 is a block/flow diagram of an exemplary cloud computing environment, in accordance with an embodiment of the present invention.

FIG. 9 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9, illustrative cloud computing environment 350 is depicted for enabling use cases of the present invention. As shown, cloud computing environment 350 includes one or more cloud computing nodes 310 with which local computing devices used by cloud consumers, such as, for example, personal digital assistant (PDA) or cellular telephone 354A, desktop computer 354B, laptop computer 354C, and/or automobile computer system 354N can communicate. Nodes 310 can communicate with one another. They can be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 9 are intended to be illustrative only and that computing nodes 310 and cloud computing environment 350 can communicate with any type of computerized device over any type of network and/or network addressable connection (e.g., using a web browser).

Figure 10:
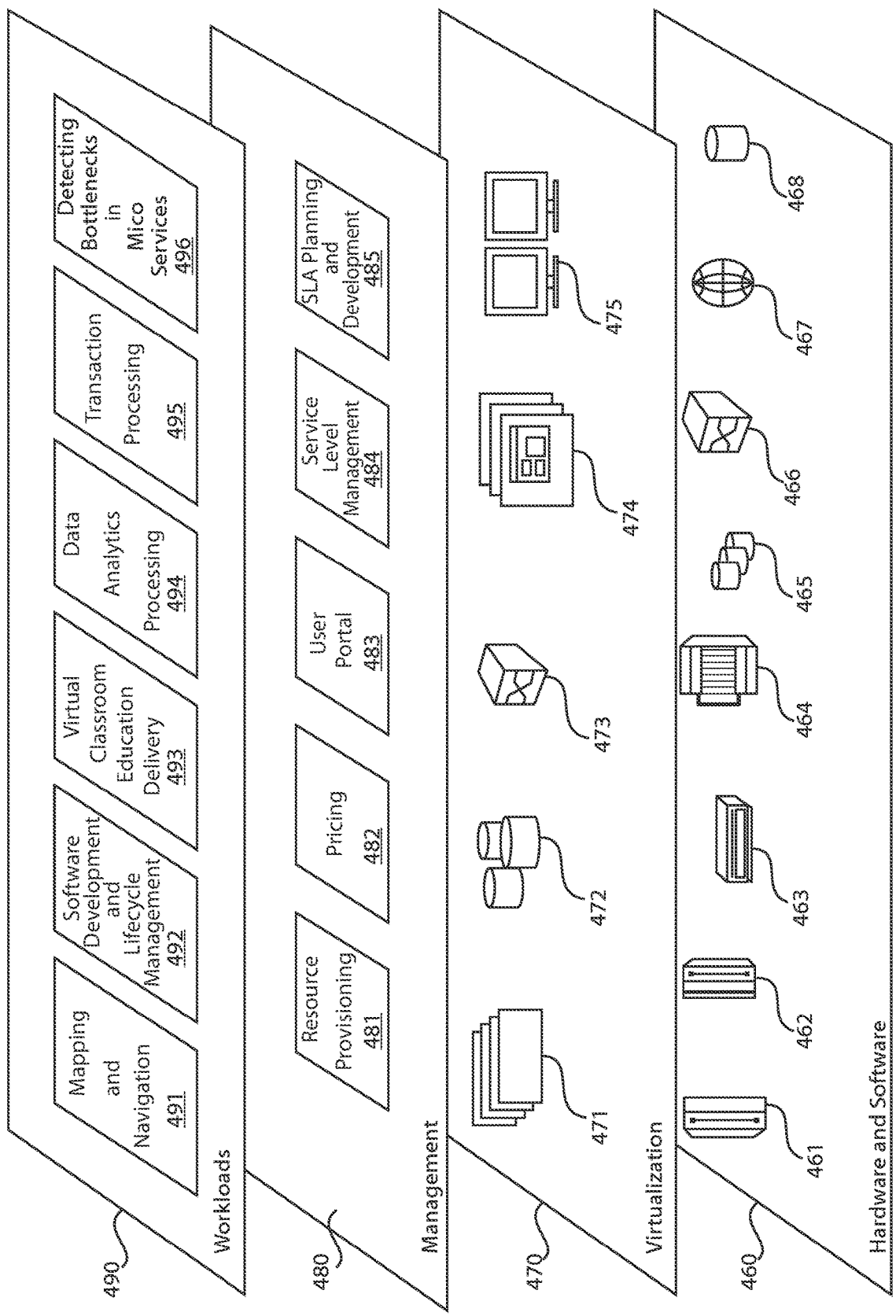
FIG. 10 is a schematic diagram of exemplary abstraction model layers, in accordance with an embodiment of the present invention.

FIG. 10 is a schematic diagram of exemplary abstraction model layers, in accordance with an embodiment of the present invention. It should be understood in advance that the components, layers, and functions shown in FIG. 10 are intended to be illustrative only and embodiments of the invention are not limited thereto. As depicted, the following layers and corresponding functions are provided:

Hardware and software layer 460 includes hardware and software components.

Examples of hardware components include: mainframes 461; RISC (Reduced Instruction Set Computer) architecture based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities can be provided: virtual servers 471; virtual storage 472; virtual networks 473, including virtual private networks; virtual applications and operating systems 474; and virtual clients 475.

In one example, management layer 480 can provide the functions described below. Resource provisioning 481 provides dynamic procurement of computing resources and other resources that are utilized to perform tasks within the cloud computing environment. Metering and Pricing 482 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 483 provides access to the cloud computing environment for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment can be utilized. Examples of workloads and functions which can be provided from this layer include: mapping and navigation 441; software development and lifecycle management 492; virtual classroom education delivery 493; data analytics processing 494; transaction processing 495; and detecting bottlenecks in μservices 496.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory, a read-only memory, an erasable programmable read-only memory (EPROM or Flash memory), a static random access memory, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a method for detecting layered bottlenecks in μservice applications (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for detecting bottlenecks in microservice cloud systems, the method comprising:
    identifying a plurality of nodes within one or more clusters associated with a plurality of containers;
    collecting thread profiles and network connectivity data by periodically dumping stacks of threads and identifying network connectivity status of one or more containers of the plurality of containers;
    classifying the stacks of threads based on a plurality of thread states;
    constructing a microservice dependency graph from the network connectivity data;
    aligning the plurality of nodes to bar graphs to depict an average number of working threads in a corresponding microservice; and
    generating, on a display, an illustration outlining the plurality of thread states, each of the plurality of thread states having a different representation.

2. The computer-implemented method of claim 1, wherein a first thread state of the plurality of thread states is a not working state.

3. The computer-implemented method of claim 2, wherein a second thread state of the plurality of thread states is a blocked at synchronization state.

4. The computer-implemented method of claim 3, wherein a third thread state of the plurality of thread states is a waiting for other services state.

5. The computer-implemented method of claim 4, wherein a fourth thread state of the plurality of thread states is a runnable to use local resources state.

6. The computer-implemented method of claim 1, wherein the bar graphs are generated directly adjacent the microservice dependency graph.

7. The computer-implemented method of claim 1, wherein the bottlenecks are detected by:
    selecting a top-level microservice handling incoming requests;
    marking the top-level microservice as a bottleneck;
    determining if a dependent service exists; and
    upon confirmation that the dependent service exists, visiting a dependent service having a largest number of working threads.

8. A computer program product for detecting bottlenecks in microservice cloud systems, the computer program product comprising a computer readable storage medium having program instructions embodied therewith, the program instructions executable by a computer to cause the computer to:
    identify a plurality of nodes within one or more clusters associated with a plurality of containers;
    collect thread profiles and network connectivity data by periodically dumping stacks of threads and identify network connectivity status of one or more containers of the plurality of containers;
    classify the stacks of threads based on a plurality of thread states;
    construct a microservice dependency graph from the network connectivity data;
    align the plurality of nodes to bar graphs to depict an average number of working threads in a corresponding microservice; and
    generate, on a display, an illustration outlining the plurality of thread states, each of the plurality of thread states having a different representation.

9. The computer program product of claim 8, wherein a first thread state of the plurality of thread states is a not working state.

10. The computer program product of claim 9, wherein a second thread state of the plurality of thread states is a blocked at synchronization state.

11. The computer program product of claim 10, wherein a third thread state of the plurality of thread states is a waiting for other services state.

12. The computer program product of claim 11, wherein a fourth thread state of the plurality of thread states is a runnable to use local resources state.

13. The computer program product of claim 8, wherein the bar graphs are generated directly adjacent the microservice dependency graph.

14. The computer program product of claim 8, wherein the bottlenecks are detected by:
    selecting a top-level microservice handling incoming requests;
    marking the top-level microservice as a bottleneck;
    determining if a dependent service exists; and
    upon confirmation that the dependent service exists, visiting a dependent service having a largest number of working threads.

15. A system for detecting bottlenecks in microservice cloud systems, comprising:
    a memory; and one or more processors in communication with the memory configured to:
- identify a plurality of nodes within one or more clusters associated with a plurality of containers;
- collect thread profiles and network connectivity data by periodically dumping stacks of threads and identify network connectivity status of one or more containers of the plurality of containers;
- classify the stacks of threads based on a plurality of thread states;
- construct a microservice dependency graph from the network connectivity data;
- align the plurality of nodes to bar graphs to depict an average number of working threads in a corresponding microservice; and
- generate, on a display, an illustration outlining the plurality of thread states, each of the plurality of thread states having a different representation.

16. The system of claim 15, wherein a first thread state of the plurality of thread states is a not working state.

17. The system of claim 16, wherein a second thread state of the plurality of thread states is a blocked at synchronization state.

18. The system of claim 17, wherein a third thread state of the plurality of thread states is a waiting for other services state.

19. The system of claim 18, wherein a fourth thread state of the plurality of thread states is a runnable to use local resources state.

20. The system of claim 15, wherein the bar graphs are generated directly adjacent the microservice dependency graph.

* * * * *